United States Patent [19]
Dew et al.

[11] Patent Number: 5,906,843
[45] Date of Patent: May 25, 1999

[54] AMORPHOUS PRECIPITATED SILICA HAVING LARGE LIQUID CARRYING CAPACITY

[75] Inventors: James T. Dew; Larry R. Evans, both of Jeannette; Diana L. Scott, Derry; Walter H. Waddell, Pittsburgh, all of Pa.

[73] Assignee: PPG Industries, Inc., Pittsburgh, Pa.

[21] Appl. No.: 08/868,107

[22] Filed: Jun. 3, 1997

Related U.S. Application Data

[63] Continuation of application No. 08/423,499, Apr. 19, 1995, abandoned.

[51] Int. Cl.$^6$ ................................................ C01B 33/12
[52] U.S. Cl. .......................... 426/2; 426/72; 426/807; 423/335; 524/492; 524/493
[58] Field of Search .................... 423/335, 339; 106/491, 287.34; 524/492, 493; 426/2, 72, 807

[56] References Cited

U.S. PATENT DOCUMENTS

| | | | |
|---|---|---|---|
| 2,657,149 | 10/1953 | Iler ........................................... | 106/308 |
| 2,731,326 | 1/1956 | Alexander et al. ........................ | 23/182 |
| 2,940,830 | 6/1960 | Thornhill .................................. | 23/182 |
| 3,644,215 | 2/1972 | Muller ...................................... | 252/404 |
| 4,094,771 | 6/1978 | Brandt et al. ............................. | 209/4 |
| 4,173,491 | 11/1979 | Abrams et al. ...................... | 106/288 B |
| 4,224,295 | 9/1980 | Brandt et al. ............................. | 423/335 |
| 4,238,322 | 12/1980 | Brandt et al. ............................. | 209/3 |
| 4,251,281 | 2/1981 | Machurat et al. ....................... | 106/288 |
| 4,434,127 | 2/1984 | Baile ........................................ | 264/236 |
| 4,486,435 | 12/1984 | Schmidt et al. .......................... | 424/252 |
| 4,495,167 | 1/1985 | Nauroth et al. .......................... | 423/339 |
| 4,533,574 | 8/1985 | Schmidt et al. .......................... | 514/474 |
| 4,603,143 | 7/1986 | Schmidt .................................... | 514/458 |
| 4,617,294 | 10/1986 | Krivak ...................................... | 514/52 |
| 4,681,750 | 7/1987 | Johnson et al. ........................... | 423/339 |
| 4,708,859 | 11/1987 | Chevallier ................................ | 423/339 |
| 4,717,561 | 1/1988 | Krivak ...................................... | 425/335 |
| 4,981,899 | 1/1991 | Nakamura et al. ...................... | 524/493 |
| 5,091,132 | 2/1992 | Haller ....................................... | 264/117 |
| 5,094,829 | 3/1992 | Krivak et al. ............................ | 423/339 |
| 5,349,021 | 9/1994 | Rooney et al. ........................... | 524/761 |
| 5,353,999 | 10/1994 | Dew et al. ................................ | 241/30 |

FOREIGN PATENT DOCUMENTS

| | | |
|---|---|---|
| 1300821 | 5/1992 | Canada . |
| 1 471 568 | 3/1967 | France . |
| 2 012 184 | 3/1970 | France . |
| 2 286 793 | 4/1976 | France . |
| 2 512 036 | 3/1983 | France . |
| 24 34 908 | 2/1976 | Germany . |
| 30 14 007 | 10/1980 | Germany . |
| 1 229 125 | 3/1971 | United Kingdom . |
| 1 289 135 | 9/1972 | United Kingdom . |
| 1 511 720 | 5/1978 | United Kingdom . |
| 1 522 685 | 8/1978 | United Kingdom . |
| 1 532 398 | 11/1978 | United Kingdom . |

OTHER PUBLICATIONS

K. Masters, *Spray Drying, An Introduction to Principles, Operational Practice and Applications*, 2d Ed., G. Godwin Ltd, London, J. Wiley & Sons, NY, 1976, pp. 74–87, 168–206 no month.

J. H. Perry, Editor, *Chemical Engineers' Handbook*, 3rd Ed., McGraw–Hill Book Co., Inc., 1950 pp. 838–848 no month.

J. H. Perry et al, Editors, *Chemical Engineers' Handbook*, 5th Ed., McGraw–Hill Book Co., 1973, pp. 18–58 –18–67 and 20–58 –20–63 no month.

ASTM Designation: C 819–77 "Standard Test Method for Specific Surface Area of Carbon or Graphite" no date.

ASTM Designation: D 2414–93, "Standard Test Method for Carbon Black —N–Dibutyl Phthalate Absorption Number" no date.

ASTM Designation: E 11–87, "Standard Specification for Wire–Cloth Sieves for Testing Purposes" no date.

*Primary Examiner*—Michael Lewis
*Assistant Examiner*—Stuart L. Hendrickson
*Attorney, Agent, or Firm*—George D. Morris

[57] ABSTRACT

Substantially dry free-flowing particles of amorphous precipitated silica have large sizes and large carrying capacities for organic liquids, and they contain little or no dust.

19 Claims, 5 Drawing Sheets

AMORPHOUS PRECIPITATED SILICA HAVING LARGE LIQUID CARRYING CAPACITY

This application is a continuation of application Ser. No. 08/432,499, filed Apr. 19, 1995, now abandoned.

BACKGROUND OF THE INVENTION

Amorphous precipitated silica has been used as a carrier for organic liquids such as, for example, vitamin E [CAS 59-02-9], vitamin E acetate [CAS 58-95-7], choline chloride [CAS 67-48-1], liquid organic additives for rubber such as for example hexakis(methoxymethyl)melamine [CAS 3089-11-0], and various organic phase change materials, i.e., an organic material which may be repeatedly transformed from the liquid phase to the solid phase and vice versa. The foregoing listing of organic liquids is by no means exhaustive, but exemplary; many other organic liquids may be employed for sundry purposes.

Situations often arise where it is more desirable to handle solids than to handle liquids. It is nonetheless ofttimes necessary to employ liquids. A major reason for using amorphous precipitated silica as a carrier for organic liquids is that the organic liquid can be absorbed by the precipitated silica and the combination thereafter handled as a free-flowing powder.

Different amorphous precipitated silicas have different carrying capacities for organic liquids. In most instances it is desirable for the carrying capacity of the silica to be as great as reasonably possible; this permits the quantity of both materials that must be handled to be minimized. It is at the same time desirable that the mixture of amorphous precipitated silica and absorbed organic liquid contain little or no dust.

The carrying capacity may be regarded as approximately the maximum amount of organic liquid that can be absorbed by the silica such that the mixture still retains the characteristics of a free-flowing powder. As a sample of the amorphous precipitated silica absorbs an organic liquid, the mixture changes from a free-flowing state to one of a semiplastic agglomeration, with an accompanying increase in viscosity. It will be appreciated that the carrying capacity of the amorphous precipitated silica for a particular organic liquid depends upon the identities of both the amorphous precipitated silica and the liquid. Also, the transition from a free-flowing powder to a semiplastic does not involve a sharp discontinuity when viscosity is plotted as a function of organic liquid content. Standard tests using a standard organic liquid are therefore used to characterize the carrying capacity, as will be discussed in more detail below.

BRIEF SUMMARY OF THE INVENTION

A new amorphous precipitated silica has been discovered which has a large carrying capacity for organic liquids and which contains little or no dust. Accordingly, one embodiment of the invention is a statistically large population of substantially dry free-flowing particles of amorphous precipitated silica characterized in that: (a) at least 80 percent by weight of the particles is retained on a 150 mesh screen; (b) at least 90 percent by weight of the particles is retained on a 200 mesh screen; (c) the particles have a DBP capacity ratio of greater than 1.1; (d) the particles are substantially free from dense shell; and (e) the particles are substantially spherical.

A second embodiment of the invention is a statistically large population of substantially dry free-flowing particles comprising particulate amorphous precipitated silica containing absorbed organic liquid, characterized in that: (a) at least 80 percent by weight of the particles is retained on a 150 mesh screen; (b) at least 90 percent by weight of the particles is retained on a 200 mesh screen; (c) the particulate amorphous precipitated silica before absorption of said organic liquid had a DBP capacity ratio of greater than 1.1; (d) the particles are substantially free from dense shell; and (e) the particles are substantially spherical.

BRIEF DESCRIPTION OF THE DRAWINGS

For a better understanding of the invention, reference may be made to the drawings wherein like numerals refer to like parts and in which.

DETAILED DESCRIPTION OF THE INVENTION

Figure 1:
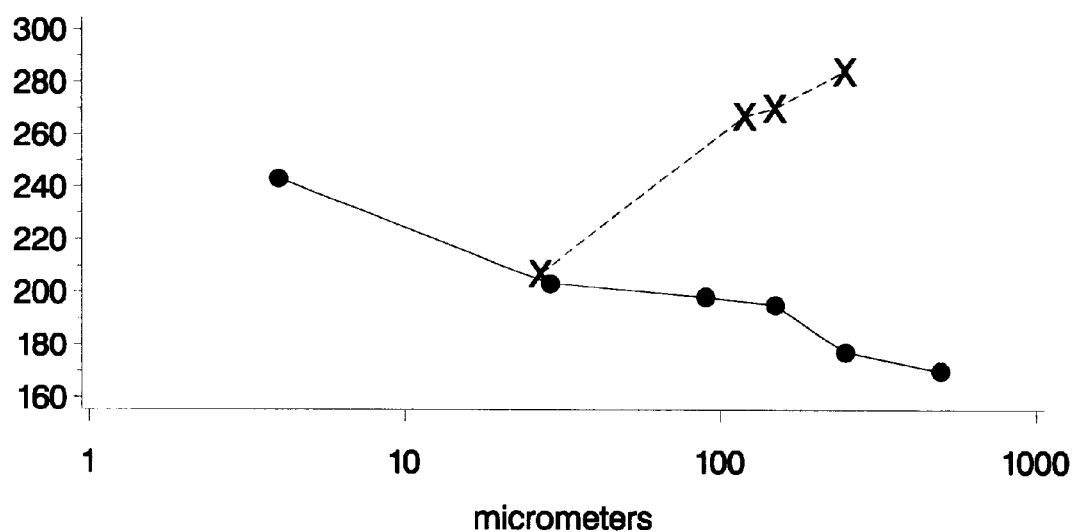
FIG. 1 is a graph showing the relationship between DBP carrying capacity and particle size of two substantially dry amorphous precipitated silicas.

Substantially dry precipitated silica is ordinarily not absolutely anhydrous but often contains adsorbed water in varying amounts which depend partly upon the prevailing relative humidity. Adsorbed water is that water which is removed from the silica by heating at 160° C. for 15 minutes at atmospheric pressure in a laboratory oven. As used in the present specification and claims, "substantially dry" refers to an adsorbed water content below 10 percent by weight. Often the adsorbed water content is below 9 percent by weight. In many cases the adsorbed water content is below 7 percent by weight.

As used herein and in the claims, "a statistically large population of substantially dry free-flowing particles of amorphous precipitated silica" means that the number of particles constituting the population of free-flowing particles of substantially dry amorphous precipitated silica is at least large enough that when the population is arbitrarily divided into halves, the particle size distribution of one half is substantially the same as that of the other half.

As used herein and in the claims, values of sieve screen mesh (viz., meshes per inch) are made in reference to screens of the Tyler Sieve Screen Series. Also as used herein and in the claims, "dust" means particles of substantially dry amorphous precipitated silica which will pass through a 200 mesh sieve screen.

At least 80 percent by weight of the particles of the present invention is retained on a 150 mesh screen. Frequently at least 80 percent by weight of the particles of the present invention is retained on a 120 mesh screen. Preferably at least 80 percent by weight of the particles of the present invention is retained on a 100 mesh screen.

At least 90 percent by weight of the particles of the present invention is retained on a 200 mesh screen. Preferably, at least 95 percent by weight of the particles of the present invention is retained on a 200 mesh screen.

The substantially dry free-flowing particles of amorphous precipitated silica of the present invention can be prepared by evaporating water from flowing drops of a slurry of precipitated amorphous silica in substantially cocurrently flowing hot gas. The drops of slurry are large and the evaporation is conducted under conditions which minimize occurrences of drop-to-drop collisions and of collisions of drops with the walls of the dryer. Exposure of the particles of amorphous precipitated silica to high temperatures which would create dense shells on the particles is avoided. Operating in this manner permits formation of substantially dry particles of amorphous precipitated silica wherein (a) at least 80 percent by weight of the particles is retained on a 150 mesh screen; (b) at least 90 percent by weight of the particles is retained on a 200 mesh screen; (c) the particles have a DBP capacity ratio of greater than 1.1; and (d) the particles are substantially free from dense shell.

The precipitated amorphous silica is itself produced by reacting alkali metal silicate, usually but not necessarily sodium silicate, with a suitable acid such as sulfuric acid, hydrochloric acid, and/or carbon dioxide, in the presence of water. As initially formed, the precipitated amorphous silica is in association with water as a slurry. This slurry can be dried in accordance with the invention, but usually it is filtered, washed with water to reduce the concentration of alkali metal salt byproduct, filtered, and reslurried either by agitation of the filter cake alone or by agitation accompanied by the addition of water.

Processes for producing slurries of precipitated amorphous silicas are described in detail in U.S. Pat. Nos. 2,657,149; 2,940,830; 4,495,167; 4,617,294; 4,681,750; 4,717,561; and 5,094,829.

Preferably the precipitation is conducted using carbon dioxide as the acid. It is similarly preferred that following precipitation the resulting slurry is brought to at least approximate neutrality by addition of hydrochloric acid. Processes for producing slurries of precipitated amorphous silicas in this manner are known and are described in U.S. Pat. Nos. 2,940,830; 4,617,294; and 4,717,561.

The preferred method for evaporating water from flowing drops of a slurry of precipitated amorphous silica in substantially cocurrently flowing hot gas is by spray drying. Spray drying slurries of precipitated amorphous silica is itself broadly known and is shown in German Offenlegungsshrift Nr. 30 14 007. However, spray drying does not produce particles of amorphous precipitated silica having the large carrying capacity for liquids which is characteristic of the present invention unless care is taken to minimize occurrences of drop-to-drop collisions and of collisions of drops with the walls of the dryer and to assure that the particles of substantially dry amorphous precipitated silica are not exposed to high temperatures which would create dense shells on the particles.

Spray dryers are available in many designs. See for example, K. Masters, *Spray Drying,* 2nd Edition, George Godwin Ltd., London/John Wiley & Sons, New York (1976); J. H. Perry, *Chemical Engineers' Handbook,* 3rd Edition, McGraw-Hill Book Co., Inc., New York (1950) pages 838 through 848; and Perry & Chilton, *Chemical Engineers' Handbook,* 5th Edition, McGraw-Hill Book Co., New York (1973) pages 18–58 through 18–67 and 20–58 through 20–63. The operating conditions which will produce particles of substantially dry amorphous precipitated silica of the present invention using one spray dryer are usually not the same for another spray dryer. Therefore, general principles will be discussed such that one of ordinary skill in the art may apply them to obtain the particles of substantially dry amorphous precipitated silica of the present invention. Not all of the general principles discussed need be applied in all cases, but the information given will provide success with no more than a few simple trials of a routine nature.

1. The preferred method for forming drops of the slurry is through use of a centrifugal pressure nozzle. These are discussed, inter alia, in K. Masters, *Spray Drying*, op. cit. supra at pages 168 through 206. It is further preferred that the nozzle be operated to produce a coarse spray.

2. The diameter of the dryer should be large enough that the spray cone pattern does not cause many collisions of drops with the walls of the dryer.

3. It is not necessary that the initial trajectory of the drops from the nozzle be cocurrent to the flow of hot gas, but the trajectory should quickly become cocurrent so that most of the total trajectory through the dryer is cocurrent with the gas. This will reduce drop-to-drop collisions.

4. The flow of hot gas should preferably be laminar flow. This also will reduce drop-to-drop collisions.

5. In cocurrent flow the drops and the hot gas travel together in substantially parallel paths and in substantially the same direction. This results in exposure of drops to high temperatures only when the solids are protected from such high temperatures by the evaporating water which acts as a thermal shield and/or sink. By the time the particle has become substantially dry in the lower portions of the dryer, the ambient gas temperatures have been reduced to levels where they will not cause formation of a dense shell on the particle. In general, drops or particles containing large proportions of water may safely be exposed to higher temperatures than drops or particles containing lesser proportions of water. As a guide, substantially dry amorphous precipitated silica should not be exposed to temperatures above 600° C., however, amorphous precipitated silica containing larger amounts of water can be exposed to temperatures above 600° C. provided a dense shell is not formed. Countercurrent spraying into gas having high temperatures should ordinarily be avoided since the particles are usually sufficiently dry by the time they are exposed to the high temperatures at the uppermost part of their trajectory that dense shells will form.

The graph in FIG. 1 shows DBP carrying capacity as a function of median particle size determined by screening for statistically large populations of two different substantially dry free-flowing amorphous precipitated silicas. The first silica is a conventional substantially dry free-flowing amorphous precipitated silica of the type described in U.S. Pat. No. 2,940,830 and the data points for such silica are represented by circles. The curve shows a general trend of the DBP carrying capacity of the conventional silica to increase as the median particle size is decreased, as for example, by milling. The second silica is a substantially dry free-flowing amorphous precipitated silica of the invention. It was produced by substantially the same process down to the point of drying as was the first silica, but it was dried in accordance with the principles of the present invention whereas the first silica was not. Data points for the second silica are represented on the graph by X's. The curve shows that the DBP carrying capacity of the silica of the present invention decreases as the median particle size is decreased, until the curve intersects the curve for the conventional silica. Further decreases in median particle size of the amorphous precipitated silica of the invention results in increases in DBP carrying capacity similar to that of the conventional silica. The graph also shows that for the larger particle sizes, the DBP carrying capacity of the substantially dry free-flowing amorphous precipitated silica of the invention is greater than that of the conventional silica.

As used herein and in the claims, the DBP carrying capacity of a statistically large population of substantially dry free-flowing amorphous precipitated silica is determined using a Hobart Model N50 Mixer (Hobart Mfg. Co., Troy, Ohio). The stainless steel bowl of the mixer is raised 3.2 millimeters by placing brass washers on the bowl attachment pins. The washers enable the aluminum in-plane blade to be lower in the mixing bowl, to prevent material from massing on the bottom of the bowl. Approximately 100 grams of room temperature substantially dry amorphous precipitated silica is weighed into the mixing bowl. The Hobart mixer is used on speed 1, i.e., at 64 revolutions per minute. The mixer is started and the addition of dibutyl phthalate (DBP) [CAS 84-74-2] is begun. The DBP is added slowly in a fine stream from a beaker while circling the outer perimeter of the mixing bowl. The circling technique prevents gathering of DBP at one place in the bowl and aids in the distribution of the DBP. The slow addition of DBP is continued incrementally until reaching the endpoint, viz., the point at which the silica-DBP mixture becomes a lump. The addition of all DBP necessary to reach the endpoint is accomplished during the first 15 minutes of mixing. An indicator of reaching the endpoint is a slower recovery time to a free flowing material after each incremental DBP addition. The results are reported as milliliters of DBP per 100 grams of dry silica, i.e., silica corrected for adsorbed water content.

As used in the present specification and claims, the DBP oil absorption of a statistically large population of particles of substantially dry free-flowing amorphous precipitated silica is determined according to ASTM D 2414-93 using dibutyl phthalate as the absorbate and a Type E Absorptometer. The DBP oil absorption of a statistically large population of particles of free-flowing substantially dry amorphous precipitated silica of the present invention is lower than its DBP carrying capacity. The results are reported as milliliters of DBP per 100 grams of dry silica, i.e., silica corrected for adsorbed water content.

Also as used in the present specification and claims, the DBP capacity ratio is the quotient obtained by dividing the DBP carrying capacity of the amorphous precipitated silica by the DBP oil absorption of the same amorphous precipitated silica. The DBP capacity ratio of the statistically large population of substantially dry free-flowing particles of amorphous precipitated silica of the present invention is at least 1.1. Frequently DBP capacity ratio is at least 1.15. Preferably the DBP capacity ratio is at least 1.2.

Referring now in greater detail the drawings, FIGS. 2–5 are photomicrographs of portions of particles of substantially dry free-flowing amorphous precipitated silicas. Because the photomicrographs are all at the same scale, and because the particles are substantially spherical, one may ascertain approximate particle size from the curvature of the shell or porous surface, as the case may be.

Figure 2:
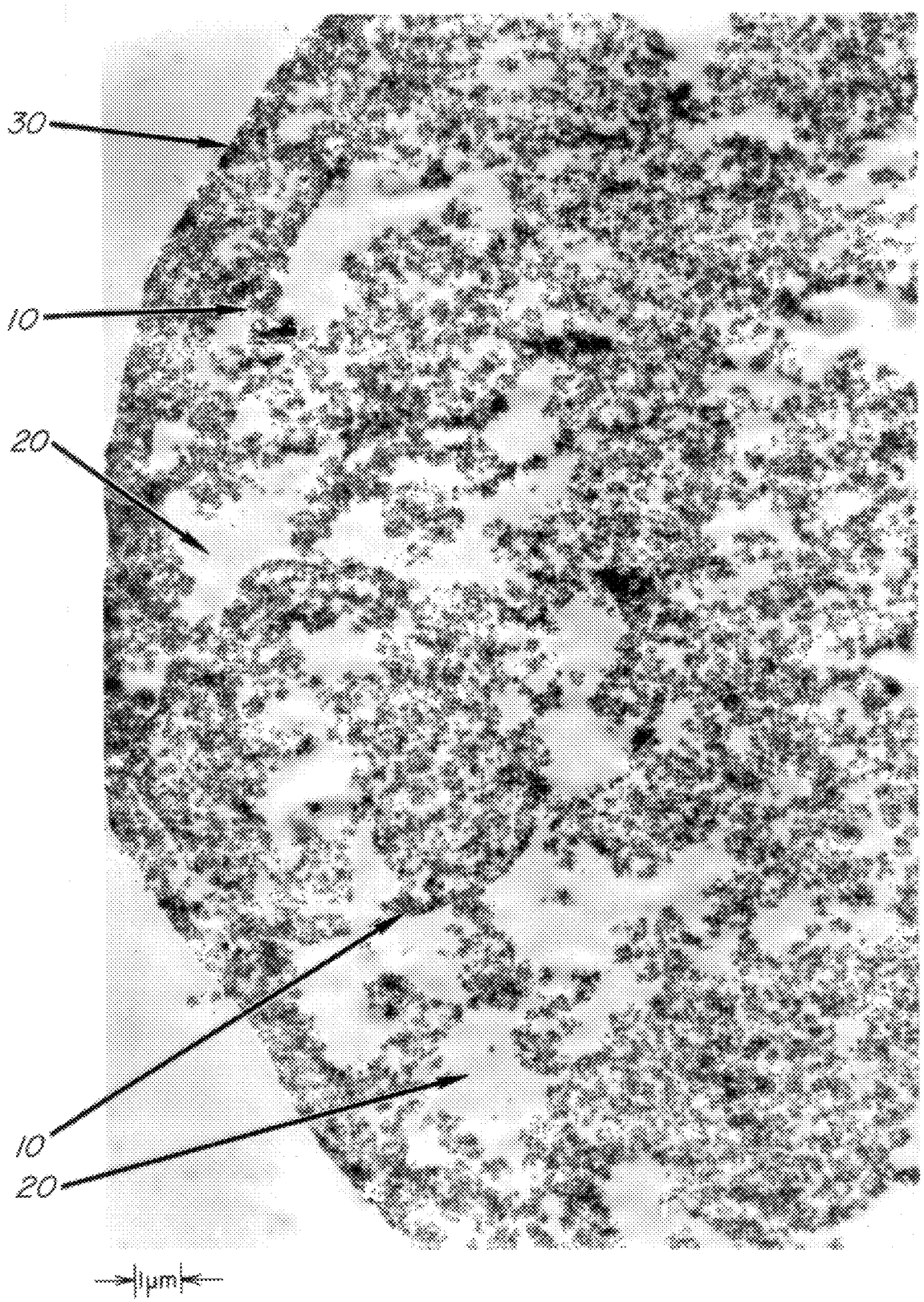
FIGS. 2–5 are photomicrographs of portions of amorphous precipitated silica particles.

FIG. 2 shows a portion of a particle of a conventional substantially dry free-flowing amorphous precipitated silica having agglomerates 10, voids 20, and a dense shell 30. The interior structure of the particle is quite porous, but the outer structure is a dense shell of material where the porosity is much less than the interior structure. The sample from which this particle was taken had a BET surface area of 152 square meters per gram, a DBP carrying capacity of 321 milliliters per 100 grams, and a DBP capacity ratio of 1.06. Approximately 100 percent of the sample will pass through a 325 mesh screen.

Figure 3:
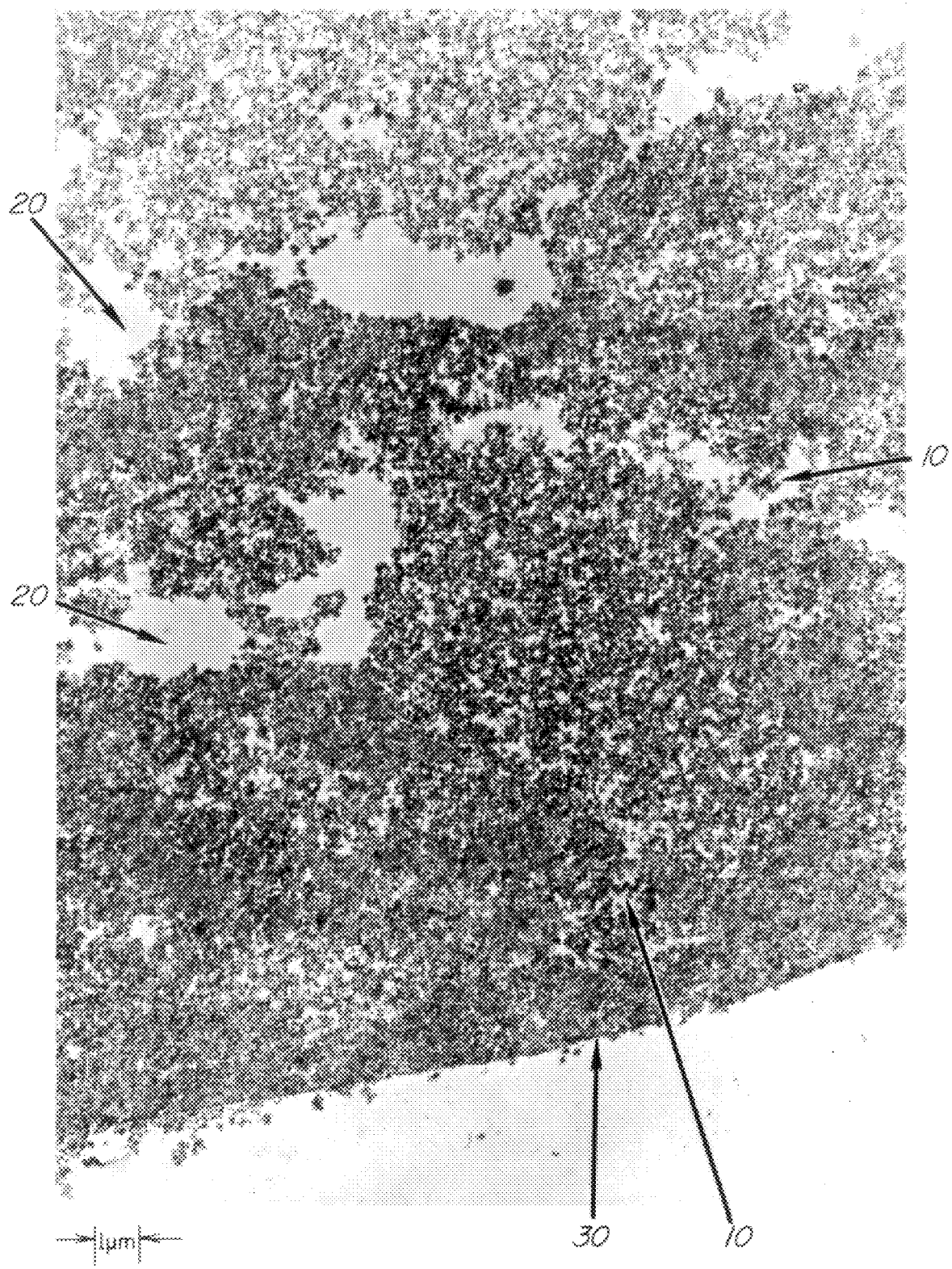

FIG. 3 shows a portion of a particle of another conventional substantially dry free-flowing amorphous precipitated silica having agglomerates 10, voids 20, and a dense shell 30. As may be seen from the lesser curvature of the dense shell 30, this particle is much larger than the particle of FIG. 2. The interior structure of the particle of FIG. 3 is porous, but the outer structure is a dense shell of material where the porosity is much less than the interior structure. The thickness of the dense shell of this particle is much greater than that of the particle of FIG. 2. The sample from which the particle of FIG. 3 was taken had a BET surface area of 133 square meters per gram, a DBP carrying capacity of 223 milliliters per 100 grams, and a DBP capacity ratio of 1.02. Approximately 100 percent of the sample is retained on a 150 mesh screen.

Figure 4:

FIG. 4 shows a portion of a particle of yet another conventional substantially dry free-flowing amorphous precipitated silica having agglomerates 10, voids 20, and a dense shell 30. As may be seen from the lesser curvature of the dense shell 30, this particle is also much larger than the particle of FIG. 2. The interior structure of the particle of FIG. 4 is porous, but the outer structure is a dense shell of material where the porosity is much less than the interior structure. The thickness of the dense shell of this particle is intermediate between that of the particle of FIG. 2 and that of the particle of FIG. 3. The thin outer region of the dense shell of the particle of FIG. 4 has been densified to a considerably greater degree than the more interior portions of the dense shell, and it appears to be glazed. The sample from which the particle of FIG. 4 was taken had a BET surface area of 167 square meters per gram, a DBP carrying capacity of 213 milliliters per 100 grams, and a DBP capacity ratio of 1.00. Approximately 100 percent of the sample is retained on a 150 mesh screen.

Figure 5:
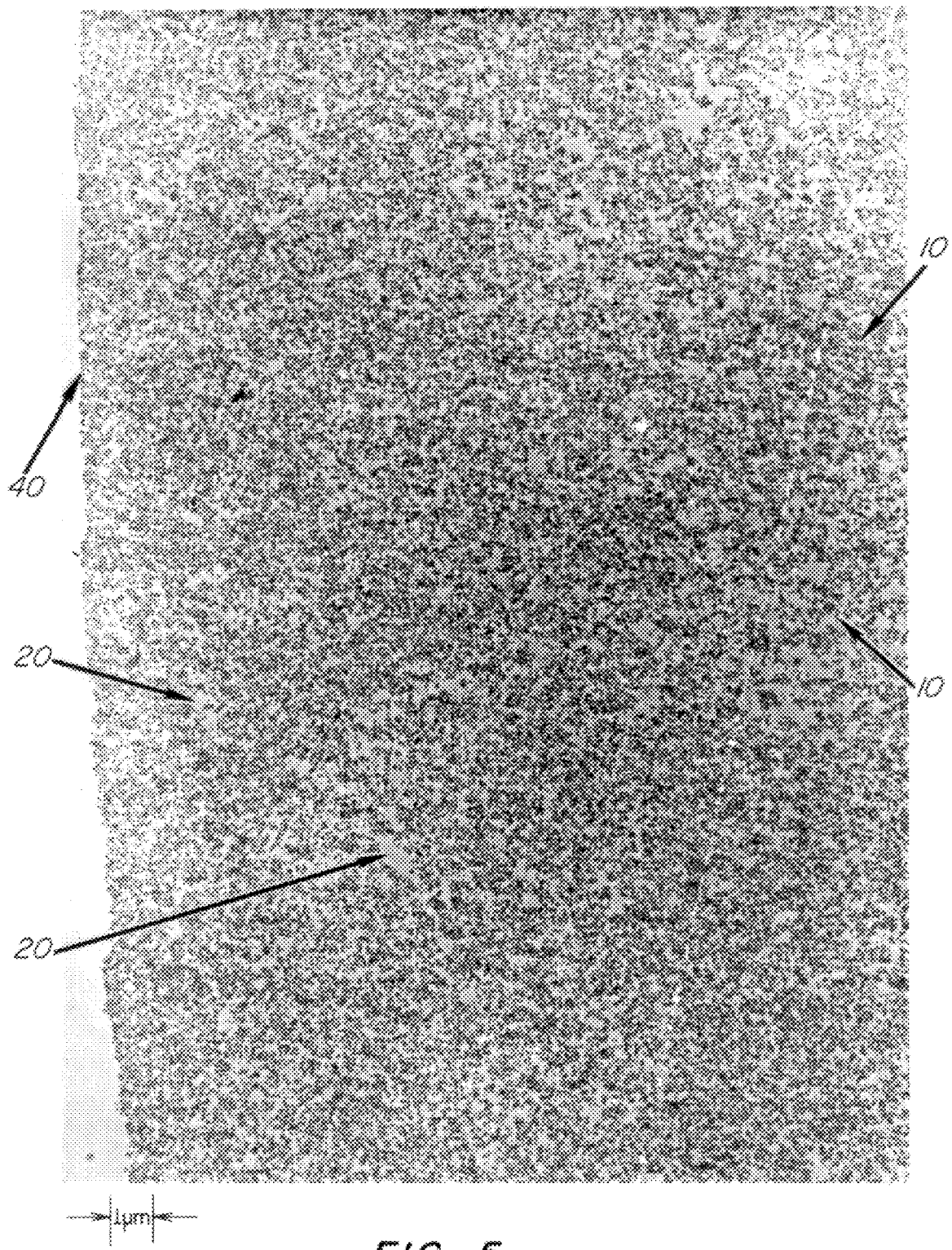

FIG. 5 shows a portion of a particle of a substantially dry free-flowing amorphous precipitated silica of the present invention having agglomerates 10, voids 20, and a porous surface 40. Both the interior structure and the surface are highly porous and the porosity is remarkably uniform throughout. A dense shell is not present. The small curvature of the surface 40 indicates that this particle is considerably larger than any of the particles of FIGS. 2, 3, or 4. The sample from which the particle of FIG. 5 was taken had a BET surface area of 144 square meters per gram, a DBP carrying capacity of 300 milliliters per 100 grams, and a DBP capacity ratio of 1.22. Approximately 100 percent of the sample is retained on a 150 mesh screen.

Although it is not desired to be bound by any theory, it is believed that the dense shells of the particles of FIGS. 2, 3, and 4 were caused by exposure of particles having insufficient moisture to be protective, to gas of high enough temperature to form dense shells. It is also believed that the dense shells inhibit the absorption of liquid into the interior voids, thereby resulting in low DBP carrying capacity. It is further believed that the dense shells provide some measure of structural integrity to the particle. It is therefore regarded as unexpected and remarkable that the large particles of the present invention which are substantially free of dense shells, have the requisite integrity to be reasonably handled for their intended purposes without large degrees of disintegration and dust production.

The surface area of the statistically large population of substantially dry free-flowing amorphous precipitated silica of the present invention may vary widely. In many cases the surface area is from 5 to 500 square meters per gram ($m^2/g$). Often the surface area is from 50 to 400 $m^2/g$. From 100 to 250 $m^2/g$ is preferred. As used in the present specification and claims, the surface area of the substantially dry free-flowing amorphous precipitated silica is the surface area determined by the Brunauer, Emmett, Teller (BET) method according to ASTM C 819-77 using nitrogen as the adsorbate but modified by outgassing the system and the sample for one hour at 180° C.

The particles of the second embodiment of the invention may be made by adding organic liquid to the particles of the first embodiment while mixing under conditions of low shear. Usually the organic liquid constitutes at least 40 percent by weight of the substantially dry particles of the second embodiment (including the organic liquid, the silica, per se, and adsorbed moisture). Often the organic liquid constitutes at least 50 percent by weight of the substantially dry particles of the second embodiment. In many instances the organic liquid constitutes at least 60 percent by weight of the substantially dry particles of the second embodiment. Preferably the organic liquid constitutes at least 70 percent by weight of the substantially dry particles of the second embodiment.

The preferred organic liquids for use in the second embodiment of the invention are liquid animal feed supplements, liquid organic additives for rubber, and organic phase change materials. Examples of liquid animal feed supplements include vitamin E, vitamin E acetate, and choline chloride. Examples of liquid additives for rubber include plasticizers and/or softeners such as paraffinic oil, aromatic oil, triethylene glycol caprate-caprylate, and vegetable oils such as rapeseed oil. Further examples of liquid additives for rubber include antiozonants such as N,N'-bis (1,4-dimethylpentyl)-1,4-phenylenediamine, tackifiers such as pine tar, activators such as diethylene glycol, accelerators such as triallyl cyanurate and the reaction product of butyraldehyde and aniline. Yet additional examples of liquid additives for rubber include adhesive/sealing agents such as liquid maleinized 1,2-polybutadiene resin, organic silanes, liquid poly(1,2-butadiene), isoprene, liquid polyisoprene, and hexakis(methoxymethyl)melamine. The particulate amorphous precipitated silica is especially useful as a carrier for liquid organic additives for rubber when, as is usually the case, it is a rubber-reinforcing silica. Particulate amorphous precipitated silica containing absorbed organic phase change material may be used for any of the various purposes disclosed in U.S. Pat. No. 5,106,520.

The invention is further described in conjunction with the following examples which are to be considered illustrative rather than limiting, and in which all parts are parts by weight and all percentages are percentages by weight unless otherwise specified.

EXAMPLE 1

Three separate batches of filter cake were each produced generally according to the following process: A 150 cubic meter reactor equipped with an agitator, a steam inlet, and a carbon dioxide gas sparger was charged with 114 cubic meters of aqueous sodium silicate solution containing 30.4 grams $Na_2O$ per liter and having a $SiO_2:Na_2O$ molar ratio of 3.25. The temperature of the sodium silicate solution was 60° C. With agitation, carbon dioxide was added at 8.8 standard cubic meters per minute for 2 hours, at 6.8 standard cubic meters per minute for 1 hour, and then at 11.3 standard cubic meters per minute for 1 hour (referenced to standard conditions of 0° C. and 760 millimeters of mercury, absolute). The resulting slurry of amorphous precipitated silica had a pH of 9.1. The slurry was fed to a series of three Dorr tanks where it was washed countercurrently with water. Prior to going into the third Dorr tank, the pH of the slurry was adjusted with hydrochloric acid to 4.1. After being washed in the third Dorr tank, the slurry was filtered to produce filter cake.

The filter cake from the first batch had a solids content of 13.2 percent by weight. A portion of this filter cake was mixed for 1 to 2 minutes with a Cowles mixer equipped with a serrated mixing blade 25.4 centimeters in diameter to obtain a uniform pumpable consistency. The slurry was pumped using an air-operated centrifugal pump through a series of three screens in the order 20 mesh, 40 mesh, 80 mesh. The filtered slurry was fed to a high pressure screw-type pump which maintained slurry feed to the nozzle of a spray dryer at a pressure in the range of from 3.1 to 3.8 megapascals. The spray dryer was a cylindrical conical bottom-vertical spray dryer of 2.6 meter diameter having 4.3 meters of straight sides and was equipped with a single spray nozzle having an orifice 1.63 millimeters in diameter (Model SG064, Bayliss Technologies, Inc., Randallstown, Md.). The slurry was sprayed substantially downwardly into cocurrently flowing hot air. The air temperature at the dryer inlet was in the range of from 371° C. to 383° C. while the air temperature at the dryer outlet was in the range of from 126° C. to 138° C. The slurry feed rate was approximately 227 kilograms of wet slurry per hour. The product was substantially dry free-flowing particles of amorphous precipitated silica of the present invention and is referred to herein as the First Product. The First Product had an adsorbed water content of 4.4 percent by weight, a surface area of 145 square meters per gram, a DBP carrying capacity of 258 milliliters per 100 grams, and a DBP capacity ratio of 1.15. Screen analysis showed that 51.9 percent by weight of the First Product was retained by a 100 mesh screen, 87.3 percent by weight was retained on a 150 mesh screen, and 4.7 weight percent by weight passed through a 200 mesh screen.

The filter cake from the second batch had a solids content of 11.7 percent by weight. A portion of this filter cake was mixed for 1 to 2 minutes with a Cowles mixer equipped with a serrated mixing blade 25.4 centimeters in diameter to obtain a uniform pumpable consistency. The slurry was pumped using an air-operated centrifugal pump through a series of three screens in the order 20 mesh, 40 mesh, 80 mesh. The filtered slurry was fed to a high pressure screw-type pump which maintained slurry feed to the nozzle of a spray dryer at a pressure in the range of from 2.6 to 3.0 megapascals. The spray dryer was a cylindrical conical bottom vertical spray dryer of 2.6 meter diameter having 4.3 meters of straight sides and was equipped with a single spray nozzle having an orifice 1.86 millimeters in diameter (Model SF073, Bayliss Technologies, Inc.). The slurry was sprayed substantially downwardly into cocurrently flowing hot air. The air temperature at the dryer inlet was in the range of from 360° C. to 371° C. while the air temperature at the dryer outlet was in the range of from 118° C. to 131° C. The slurry feed rate was approximately 269 kilograms of wet slurry per hour. The intermediate product was free-flowing particles of amorphous precipitated silica. The intermediate product had a water content of approximately 25 percent by weight. The intermediate product was dried in a circulating air oven for 4 hours at 105° C. The product was substantially dry free-flowing particles of amorphous precipitated silica of the present invention and is referred to herein as the Second Product. The Second Product had an adsorbed water content of 2.2 percent by weight, a surface area of 145 square meters per gram, a DBP carrying capacity of 300 milliliters per 100 grams, and a DBP capacity ratio of 1.22. Screen analysis showed that 64.3 percent by weight of the Second Product was retained by a 100 mesh screen, 95.1 percent by weight was retained on a 150 mesh screen, and 0.6 weight percent by weight passed through a 200 mesh screen. The particle from which the photomicrograph of FIG. 5 was made, was taken from the Second Product.

The filter cake from the third batch was fed directly to a rotary dryer where it was substantially dried. The substantially dry solids were then milled in a roller mill. The product was a conventional substantially dry amorphous precipitated silica and is referred to herein as the Control. The Control had an adsorbed water content of 5.6 percent by weight, a DBP carrying capacity of 185 milliliters per 100 grams, and a DBP capacity ratio of 0.90. Approximately 100 percent of the Control will pass through a 325 mesh screen.

EXAMPLE 2

The stainless steel bowl of a Hobart Model N50 Mixer was raised 3.2 millimeters by placing brass washers on the bowl attachment pins. The washers enable the aluminum in-plane blade to be lower in the mixing bowl, to prevent material from massing on the bottom of the bowl. Approximately 200 grams of room temperature substantially dry amorphous precipitated silica was weighed into the mixing bowl. The Hobart mixer was used on speed 1, i.e., at 64 revolutions per minute. The mixer was started and the addition of Cyrez® 963 liquid hexakis(methoxymethyl) melamine resin (Cytec Industries, Inc., Stamford, Conn.) was begun. The liquid resin was added slowly in a fine stream from a beaker while circling the outer perimeter of the mixing bowl. The circling technique prevents gathering of liquid resin at one place in the bowl and aids in the distribution of the liquid resin. The slow addition of liquid resin was continued incrementally until either the endpoint, viz., the point at which the silica-liquid resin mixture became a lump, or it was terminated prior to the endpoint. The addition of all liquid resin necessary to reach the endpoint was accomplished during the first 15 minutes of mixing. An indicator of reaching the endpoint is a slower recovery time to a free flowing material after each incremental liquid resin addition and a texture appearance similar to brown sugar. Mixing is interrupted at approximately 20 minutes after beginning the addition to observe if liquid resin has accumulated at any place in the mixing bowl. If necessary the bowl would be scraped with a spatula. Mixing was resumed and then stopped when a total mixing time of 30 minutes had been achieved. The results are reported as weight percent liquid resin, based on the mixture of liquid resin and silica, including adsorbed water, and are reported in Table 1.

TABLE 1

| Silica | Resin. wt % | Remarks |
|---|---|---|
| Example 1 | | |
| First Product | 72.0 | Free-flowing material. |
| Second Product (FIG. 5) | 74.2 | Free-flowing material. |
| Example 1 | | |
| Control | 66.4 | Thick, sticky material. |
| FIG. 2 | 72.4 | Thick, sticky material. |
| FIG. 3 | 70.4 | Thick, sticky material. |
| FIG. 4 | 68.8 | Thick, sticky material. |

EXAMPLE 3

Vitamin E acetate rather than liquid hexakis (methoxymethyl)melamine resin was mixed with a portion of the First Product of Example 1 using the general procedure of Example 2. The mixture contained 60.0 weight percent vitamin E acetate and was a free-flowing material.

EXAMPLE 4

Vitamin E acetate rather than liquid hexakis (methoxymethyl)melamine resin was mixed with a portion of the First Product of Example 1 using the general procedure of Example 2. The mixture contained 68.0 weight percent vitamin E acetate and was a free-flowing material.

EXAMPLE 5

Aromatic rubber processing oil rather than liquid hexakis (methoxymethyl)melamine resin was mixed with a portion of the First Product of Example 1 using the general procedure of Example 2. The mixture contained 68.9 weight percent aromatic rubber processing oil and was a free-flowing material.

EXAMPLE 6

Yucca extract rather than liquid hexakis(methoxymethyl) melamine resin was mixed with a portion of the First Product of Example 1 using the general procedure of Example 2. The mixture contained 60.0 weight percent yucca extract and was a free-flowing material.

EXAMPLE 7

Vitamin E oil rather than liquid hexakis(methoxymethyl) melamine resin was mixed with a portion of the First Product of Example 1 using the general procedure of Example 2. The mixture contained 65.0 weight percent vitamin E oil and was a free-flowing material.

Although the present invention has been described with reference to specific details of certain embodiments thereof, it is not intended that such details should be regarded as limitations upon the scope of the invention except insofar as they are included in the accompanying claims.

We claim:

1. A statistically large population of substantially dry free-flowing particles of amorphous precipitated silica characterized in that:
   (a) at least 80 percent by weight of said particles is retained on a 150 mesh screen;
   (b) at least 90 percent by weight of said particles is retained on a 200 mesh screen;
   (c) said particles have a DBP capacity ratio of greater than 1.1;
   (d) said particles are substantially free from dense shell; and
   (e) said particles are substantially spherical.

2. The statistically large population of claim 1 wherein at least 80 percent by weight of said particles is retained on a 100 mesh screen.

3. The statistically large population of claim 1 wherein at least 95 percent by weight of said particles is retained on a 200 mesh screen.

4. The statistically large population of claim 1 wherein said particles have a DBP capacity ratio of greater than 1.15.

5. The statistically large population of claim 1 wherein said particles have a DBP capacity ratio of greater than 1.2.

6. The statistically large population of claim 1 wherein:
   (a) at least 80 percent by weight of said particles is retained on a 100 mesh screen;
   (b) at least 95 percent by weight of said particles is retained on a 200 mesh screen; and
   (c) said particles have a DBP capacity ratio of greater than 1.2.

7. A statistically large population of substantially dry free-flowing particles comprising particulate amorphous precipitated silica containing absorbed organic liquid, characterized in that:

(a) at least 80 percent by weight of said particles is retained on a 150 mesh screen;

(b) at least 90 percent by weight of said particles is retained on a 200 mesh screen;

(c) said particulate amorphous precipitated silica before absorption of said organic liquid had a DBP capacity ratio of greater than 1.1;

(d) said particles are substantially free from dense shell; and (e) said particles are substantially spherical.

8. The statistically large population of claim 7 wherein said organic liquid constitutes at least 40 percent by weight of said particles.

9. The statistically large population of claim 7 wherein said organic liquid constitutes at least 50 percent by weight of said particles.

10. The statistically large population of claim 7 wherein said organic liquid constitutes at least 60 percent by weight of said particles.

11. The statistically large population of claim 7 wherein said organic liquid constitutes at least 70 percent by weight of said particles.

12. The statistically large population of claim 7 wherein said organic liquid is liquid animal feed supplement.

13. The statistically large population of claim 12 wherein said liquid animal feed supplement constitutes at least 40 percent by weight of said particles.

14. The statistically large population of claim 13 wherein said liquid animal feed supplement is vitamin E.

15. The statistically large population of claim 13 wherein said liquid animal feed supplement is vitamin E acetate.

16. The statistically large population of claim 13 wherein said liquid animal feed supplement is choline chloride.

17. The statistically large population of claim 7 wherein said organic liquid is liquid organic additive for rubber.

18. The statistically large population of claim 17 wherein said liquid organic additive for rubber is selected from softener, antiozonant, tackifier, activator, accelerator, and adhesive/sealing agent.

19. The statistically large population of claim 7 wherein said organic liquid is liquid hexakis(methoxymethyl) melamine resin.

* * * * *